Dec. 16, 1930.  S. BEATTY  1,785,432
BRAKE MECHANISM
Filed Jan. 9, 1930  3 Sheets-Sheet 2
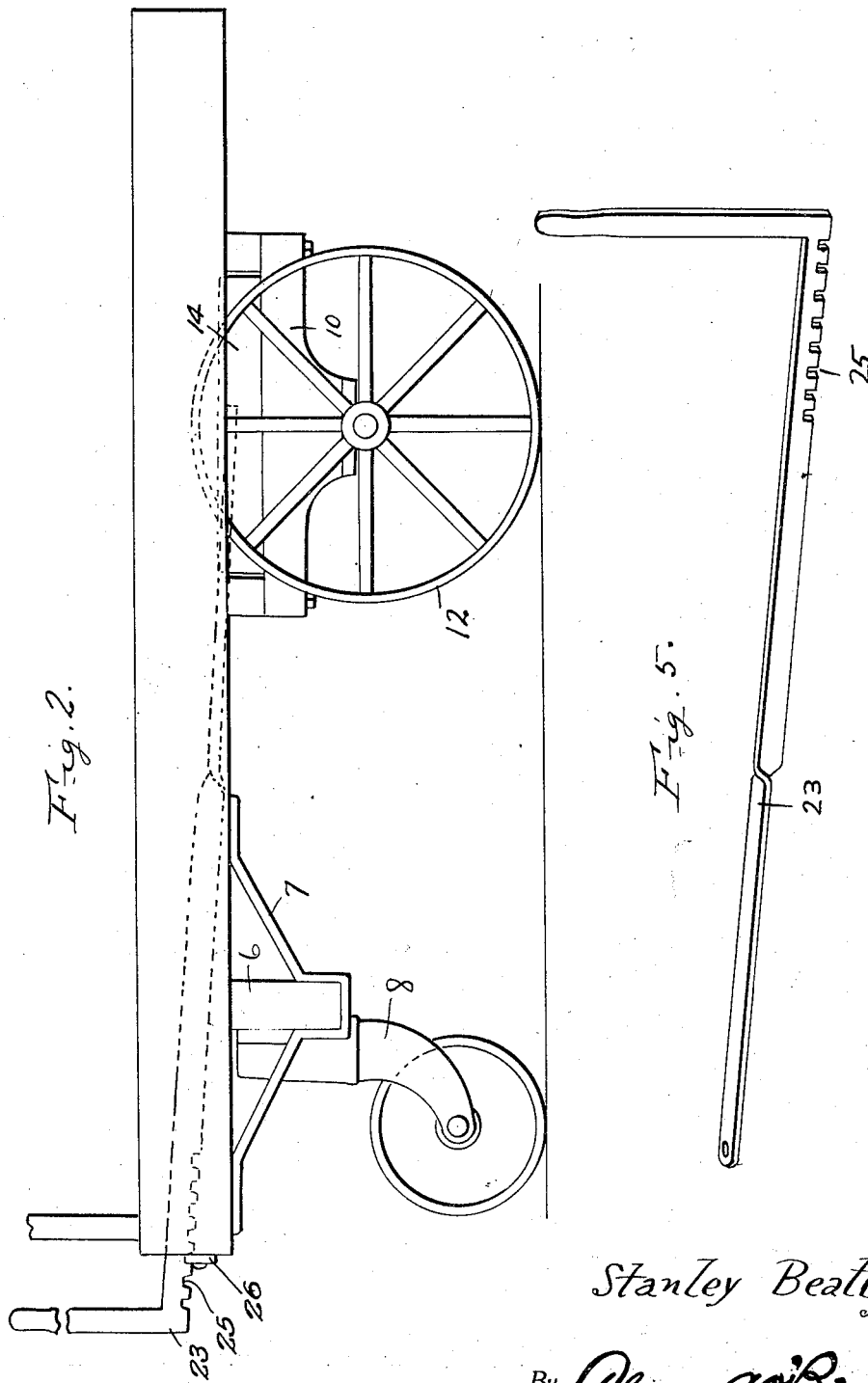

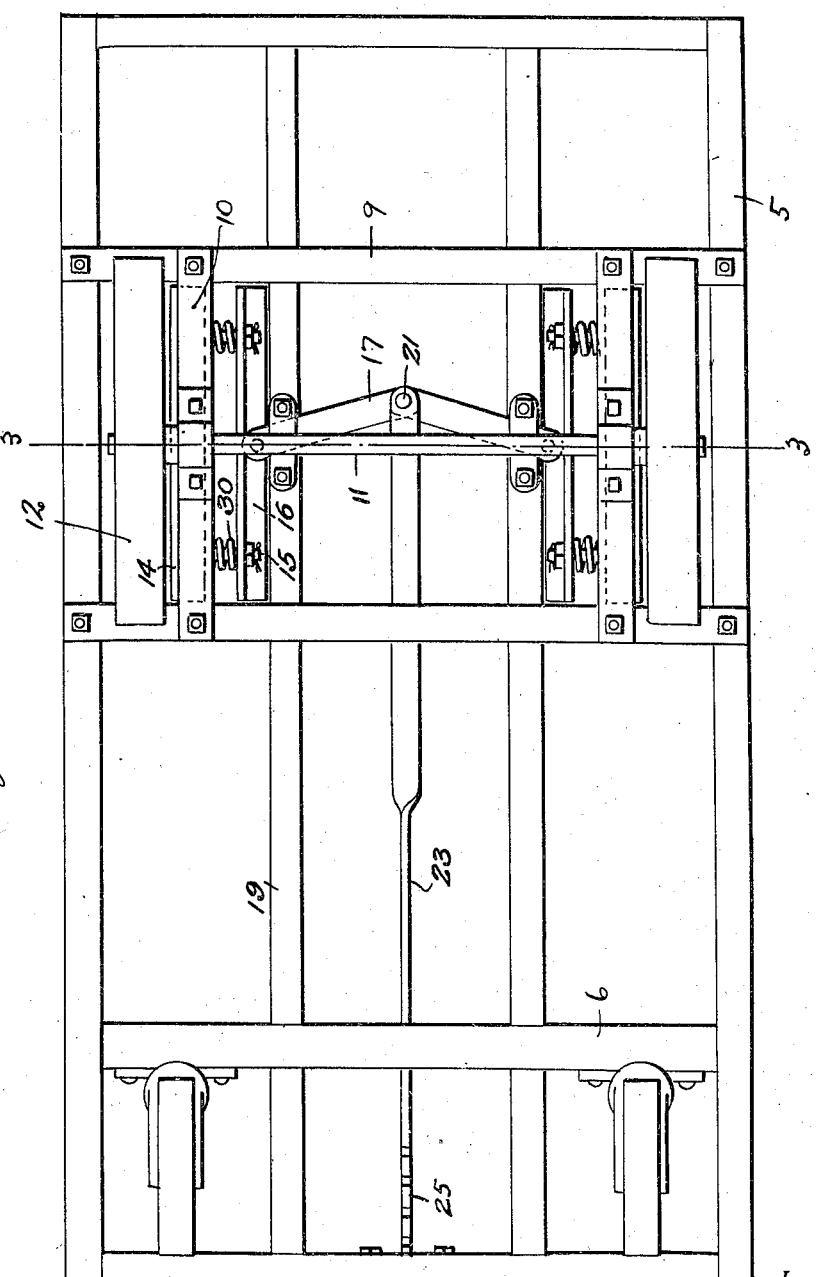

Dec. 16, 1930.  S. BEATTY  1,785,432
BRAKE MECHANISM
Filed Jan. 9, 1930  3 Sheets-Sheet 3
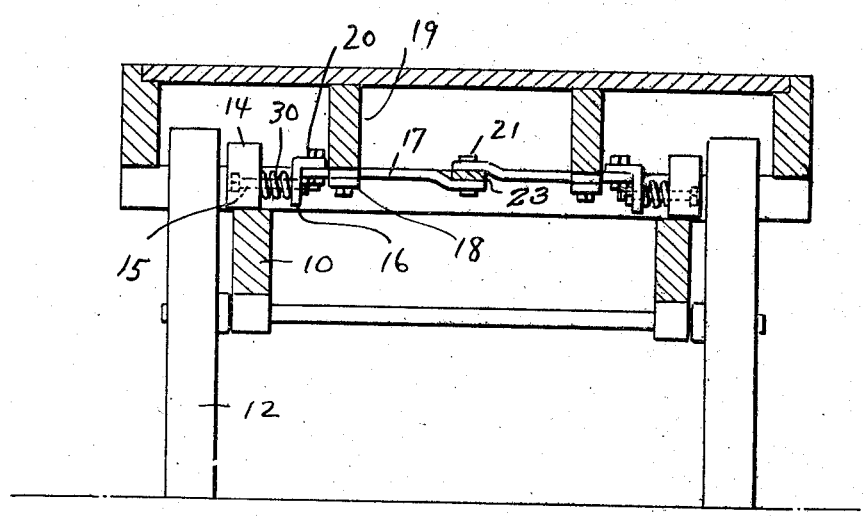
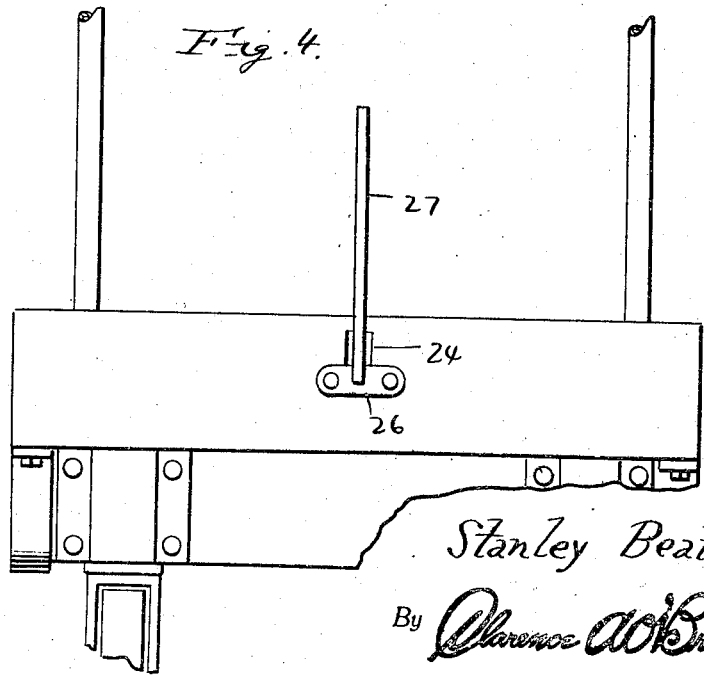
Inventor
Stanley Beatty
By Clarence A. O'Brien
Attorney Patented Dec. 16, 1930

1,785,432

UNITED STATES PATENT OFFICE

STANLEY BEATTY, OF HIGHLAND, NEW YORK

BRAKE MECHANISM

Application filed January 9, 1930. Serial No. 419,634.

The present invention relates to a brake mechanism, and contemplates a structure primarily intended for use upon hand trucks of a well known type so that such trucks can be conveniently held against movement when desired.

The nature and advantages of the invention will be better understood when the following detailed description is read in connection with the accompanying drawings, the invention residing in the construction, combination and arrangement of parts as claimed.

In the drawings forming part of this application, the like numerals of reference indicate similar parts of the several views, and wherein:

Figure 1 is a bottom plan view embodying the features of my invention,

Figure 2 is a side elevation thereof,

Figure 3 is a vertical transverse section therethrough taken substantially on the line 3—3 of Figure 1, Figure 4 is a fragmentary front elevation of the truck, and Figure 5 is a perspective view of the operating rod.

Referring to the drawings in detail it will be seen that the numeral 5 denotes a rectangular frame across the forward end of which there is suspended a bar 6 by means of strap iron cradles 7. Caster wheels 8 are connected to this bar 6.

A pair of cross bars 9 are mounted under the rear portion of the frame in spaced parallelism to each other and have secured thereto blocks 10 under which are mounted axle 11 with wheels 12 journalled on the ends thereof.

This structure thus far described is conventional. My invention resides in the provision of a pair of elongated shoes 14 resting on the blocks 10 and having bolts 15 countersunk therein and extending inwardly therefrom through openings in angle iron bars 16.

Links 17 are slidable through guides 18 under longitudinal members 19 of the frame 5 and are pivotally connected with centers of the bars 16 by means of bolts 20. The inner ends of the links are pivoted as at 21 to an operating rod 23 which is slidable through a slot 24 in the front cross member of the frame 5 and has a plurality of notches 25 to receive the upper edge of a plate 26 fixed to the front end of the frame across the lower end of the slot 24.

A handle extension 27 rises from the front end of the operating rod. Springs 30 are disposed about the bolts 15. It will therefore be seen that when the rod 23 is pulled forwardly thereby rocking the links 17 tending to bring them into alinement with each other, the angle iron bars 16 are forced outwardly tensioning the springs 30 to resiliently force the shoes into engagement with the inner sides of the wheels 12 for braking purposes as will be quite apparent.

Obviously the brake mechanism may be set in an off or on position by the proper manipulation of the operating rod in conjunction with the brake 26.

It will further be seen that the structure is exceedingly simple, inexpensive to manufacture, easy to install, compact and convenient in its arrangement of parts, and thoroughly efficient and reliable in use and operation.

The present embodiment of the invention however, has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a truck structure of the class described, a frame, a pair of spaced cross members under the frame, a pair of longitudinally disposed blocks under the cross members, an axle mounted under the blocks transversely of the frame, wheels journaled on the axle, shoes slidably mounted on top of the blocks, bolts extending inwardly from the shoes, a pair of bars through which the bolts are slidable, springs on the bolts between the bars and the shoes, and means for moving the bars laterally in respect to the frame for tensioning and untensioning the springs to apply or disengage the brake.

2. In a truck structure of the class described, a frame, a pair of spaced cross members under the frame, a pair of longitudinally disposed blocks under the cross members, an axle mounted under the blocks transversely of the frame, wheels journaled on the axle, shoes slidably mounted on top of the blocks, bolts extending inwardly from the shoes, a pair of bars through which the bolts are slidable, springs on the bolts between the bars and the shoes, and means for moving the bars laterally in respect to the frame for tensioning and untensioning the springs to apply or disengage the brake, said last mentioned means comprising a pair of guides mounted on the frame, links slidable and rockable through the guides, and pivotally connected with the bars, a rod pivotally connected with the inner ends of the links for rocking the same to move the bars.

3. In a truck structure of the class described, a frame, a pair of spaced cross members under the frame, a pair of longitudinally disposed blocks under the cross members, an axle mounted under the blocks transversely of the frame, wheels journaled on the axle, shoes slidably mounted on top of the blocks, bolts extending inwardly from the shoes, a pair of bars through which the bolts are slidable, springs on the bolts between the bars and the shoes, and means for moving the bars laterally in respect to the frame for tensioning and untensioning the springs to apply or disengage the brake, said last mentioned means comprising a pair of guides mounted on the frame, links slidable and rockable through the guides, and pivotally connected with the bars, a rod pivotally connected with the inner ends of the links for rocking the same to move the bars, said rod being slidable through an opening in the front end of the frame.

4. In a truck structure of the class described, a frame, a pair of spaced cross members under the frame, a pair of longitudinally disposed blocks under the cross members, an axle mounted under the blocks transversely of the frame, wheels journaled on the axle, shoes slidably mounted on top of the blocks, bolts extending inwardly from the shoes, a pair of bars through which the bolts are slidable, springs on the bolts between the bars and the shoes, and means for moving the bars laterally in respect to the frame for tensioning and untensioning the springs to apply or disengage the brake, said last mentioned means comprising a pair of guides mounted on the frame, links slidable and rockable through the guides, and pivotally connected with the bars, a rod pivotally connected with the inner ends of the links for rocking the same to move the bars, said rod being slidable through an opening in the front end of the frame, the front end of the rod being provided with a plurality of notches, a plate on the front end of the frame across the bottom of the slot, so that said notches may be engaged with the upper edge thereof for holding the rod in a desired set position.

5. In a truck structure of the class described, a frame, a pair of spaced cross members under the frame, a pair of longitudinally disposed blocks under the cross members, an axle mounted under the blocks transversely of the frame, wheels journaled on the axle, shoes slidably mounted on top of the blocks, bolts extending inwardly from the shoes, a pair of bars through which the bolts are slidable, springs on the bolts between the bars and the shoes, and means for moving the bars laterally in respect to the frame for tensioning and untensioning the springs to apply or disengage the brake, said last mentioned means comprising a pair of guides mounted on the frame, links slidable and rockable through the guides, and pivotally connected with the bars, a rod pivotally connected with the inner ends of the links for rocking the same to move the bars, said rod being slidable through an opening in the front end of the frame, the front end of the rod being provided with a plurality of notches, a plate on the front end of the frame across the bottom of the slot, so that said notches may be engaged with the upper edge thereof for holding the rod in a desired set position, and a handle rising from the forward end of the rod for convenient operation thereof.

In testimony whereof I affix my signature.

STANLEY BEATTY.